US008112597B2

(12) United States Patent
Pattabiraman et al.

(10) Patent No.: US 8,112,597 B2
(45) Date of Patent: Feb. 7, 2012

(54) CRITICAL MEMORY

(75) Inventors: Karthik Pattabiraman, Urbana, IL (US); Vinod K. Grover, Mercer Island, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/608,698

(22) Filed: Dec. 8, 2006

(65) Prior Publication Data

US 2008/0140957 A1    Jun. 12, 2008

(51) Int. Cl.
 *G06F 12/00* (2006.01)
(52) U.S. Cl. .......... 711/161; 711/E12.098; 711/E12.103
(58) Field of Classification Search .................. 711/161
 See application file for complete search history.

(56) References Cited

U.S. PATENT DOCUMENTS

| | | | |
|---|---|---|---|
| 3,742,458 A | | 6/1973 | Inoue et al. |
| 4,177,510 A | | 12/1979 | Appell et al. |
| 4,388,695 A | | 6/1983 | Heinemann |
| 4,937,736 A | | 6/1990 | Chang et al. |
| 4,975,878 A | | 12/1990 | Boddu et al. |
| 5,437,012 A | * | 7/1995 | Mahajan ...................... 711/111 |
| 5,559,992 A | | 9/1996 | Stutz et al. |
| 5,590,277 A | * | 12/1996 | Fuchs et al. ................ 714/38.13 |
| 5,867,655 A | | 2/1999 | DeRoo et al. |
| 5,941,998 A | * | 8/1999 | Tillson ............................ 714/54 |
| 5,964,835 A | | 10/1999 | Fowler et al. |
| 6,141,770 A | * | 10/2000 | Fuchs et al. ..................... 714/11 |
| 6,397,293 B2 | * | 5/2002 | Shrader et al. ................ 711/114 |
| 6,408,373 B2 | | 6/2002 | Burger et al. |
| 6,629,110 B2 | * | 9/2003 | Cane et al. .................... 707/204 |
| 6,636,971 B1 | | 10/2003 | Loukianov |
| 6,718,274 B2 | | 4/2004 | Huang et al. |

OTHER PUBLICATIONS

Dean Kent, ("Parity and ECC—How They Work"), Jun. 13, 2000, pp. 1-4, http://www.realworldtech.com/page.cfm?ArticleID=RWT061300000000.*
Michael D. Smith et al. ("Boosting Beyond Static Scheduling in a Superscalar Processor"), May 1990, pp. 1-16, http://suif.stanford.edu/papers/isca90.pdf.*
Virendra J. Marathe et al., ("Adaptive Software Transactional Memory"), vol. 3724/2005, Oct. 11, 2005, pp. 354-368 http://www.springerlink.com/content/1hu416gfjwtex64t/fulltext.pdf.*
Webopedia, ("API"), Jun. 21, 2000, pp. 1-3, http://web.archive.org/web/20000621114956/http://www.webopedia.com/TERM/A/API.html.*

(Continued)

*Primary Examiner* — Pierre-Michel Bataille
*Assistant Examiner* — Christopher Birkhimer
(74) *Attorney, Agent, or Firm* — Workman Nydegger (57) ABSTRACT

Typical computer programs may incur costly memory errors that result in corrupted data. A new memory model is presented wherein it may be determined that certain data is critical and critical data may be stored and protected during computer application execution. Critical Memory allows that data determined to be critical may be stored and retrieved using functions enabled to increase the reliability of the data. Critical Memory presents a memory model where a subset of memory designated as critical memory may be used to store a subset of data deemed critical data. Probabilistic guarantees of data value consistency are provided by the employment of the new memory model. The memory model and functions presented are compatible with existing third-party libraries such that third-party libraries may be compatibly called from processes using critical memory.

20 Claims, 5 Drawing Sheets

OTHER PUBLICATIONS

Edward Mendelson, (Norton Ghost 9.0), Sep. 9, 2004, pp. 1-3, http://www.pcmag.com/article2/0,2817,1644437,00.asp.*

Omar Cintron, (Drive Image 7), Jun. 8, 2004, pp. 1-3, http://www.pcmag.com/article2/0,2817,1585244,00.asp.*

Mondrian Memory Protection http://www.cag.csail.mit.edu/scale/papers/mmp-asplos2002.pdf.

Implementing Basic Memory Protection in VxWorks: A Best Practices Guide http://www.windriver.com/whitepapers/wp_vxworks_vxvmi.pdf.

Karthik Pattabiraman et al., Samurai—Protecting Critical Heap Data in Unsafe Languages, Jun. 28, 2006 (18 pages).

* cited by examiner

CRITICAL MEMORY

CROSS-REFERENCE TO RELATED APPLICATIONS

None.

BACKGROUND

Background and Relevant Art

Computer programs are ubiquitous and are used not just to direct the functionality of a conventional computer but also to control and enhance the functionality of myriad modern products and appliances. For instance, televisions, household appliances, automobiles, medical devices, and so forth, may incorporate computer programs to direct their functionality. Proper storing, reading, writing, and manipulation of data are inherent to the execution of computer programs. That the data written or stored is not corrupted or inadvertently altered prior to a subsequent read access is something which is assumed by executing software and, if otherwise, may cause executing software to fail to complete successfully or to execute or complete while producing an erroneous or suspect result.

Current computer memory models treat all data in an address space as functionally equivalent, even though, in practice, some data may be far more important than others in the successful or correct execution of a particular computer program. Memory may be written and read, for instance, by entities such as application programs, by functions and subroutines within an application program, and by third-party libraries called by application programs. There is often little or no protection or verification that the data being written or read by any of these particular entities is correct or that it is being written to or read from the correct memory location. Because one entity may be relying on data that may or may not be overwritten or otherwise altered or corrupted by another entity, there is a danger that erroneous, inadvertently altered, or corrupted data may adversely affect the proper and correct execution of a computer program.

In type safe programming languages like Pascal and Java, only an entity which knows what type of data it is accessing may read from or write to the data location. Although this may insure that only the proper type of data is being written or read, it in no way guarantees that the values being written or read are safe. Furthermore, even type-safe languages cannot protect against corruption of pointers or handles to memory locations or corruption, such as through hardware errors, to the data within the memory locations, themselves.

Computer programming languages such as C, C++, and others do not typically provide even the level of intrinsic guarantees about memory safety which are present in type-safe languages such as Java. Many applications are still written using these languages for performance and compatibility reasons and, as a result, memory errors continue to be common causes of both program failures and security vulnerabilities. In a typical C or C++ program, for example, it is possible for an erroneous pointer or memory read or write to cause the application to terminate abnormally (i.e., "crash") or to produce incorrect output or results.

Beyond the corruption due to inadvertently erroneous reads and writes, hardware errors may also introduce possible errors to otherwise correctly executing software. Even an otherwise correctly written program calling only correctly written subroutines or libraries may suffer ill effects if a memory location, itself, is somehow corrupted or its value inadvertently changed.

Because of the sometimes unreliable nature of data stored in computer memory and the inherent reliance of software on all data being perfectly reliable, computer software continues to be plagued with problems of reliable execution and production of reliable results.

BRIEF SUMMARY

A new approach is provided for providing memory safety to applications written in computer languages which may or may not provide adequate safety measures. The approach is taken that some data—critical data—may be more important than other data, and that critical data requires stronger consistency guarantees than other, non-critical, data For example, in a banking application, individual account information may be more important than the view data used to populate a user interface.

As illustrative but not restrictive, and although not required, embodiments of the present invention relate to the protection of critical data and critical memory variables within a software application. The present invention relates to the designation of certain program data as critical data and certain computer memory as critical memory and embodiments allowing for certain verified (i.e., critical) operations on critical memory which will ensure that all data written to and read from critical memory is consistent and free from errors, corruption and inadvertent updates.

Critical Memory, when implemented in software (i.e. Software Critical Memory ("SCM")), provides probabilistic guarantees that data written with critical stores to critical memory locations and read with critical loads will remain consistent in spite of intervening normal stores of conflicting data to the same location. When implemented in hardware, CM may provide absolute guarantees. Various degrees of compatibility are provided so that third-party libraries, processes, and function calls may be called with successful results despite the libraries not having knowledge of CM functionality or semantics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention relate to Critical Memory (CM). CM modifies a typical, flat, computer memory model and CM recognizes that certain data may be critical to correct program execution but that not necessarily all data within a computer program context is critical to correct program execution. CM allows certain data to be marked as critical and allows for a distinction between critical and non-critical data. The embodiments of the present invention may comprise, but are not limited to, a special purpose or general-purpose computer including various computer hardware, as discussed in greater detail below, as well as methods, systems, computer-executable instructions, and computer program product embodiments.

Figure 1:
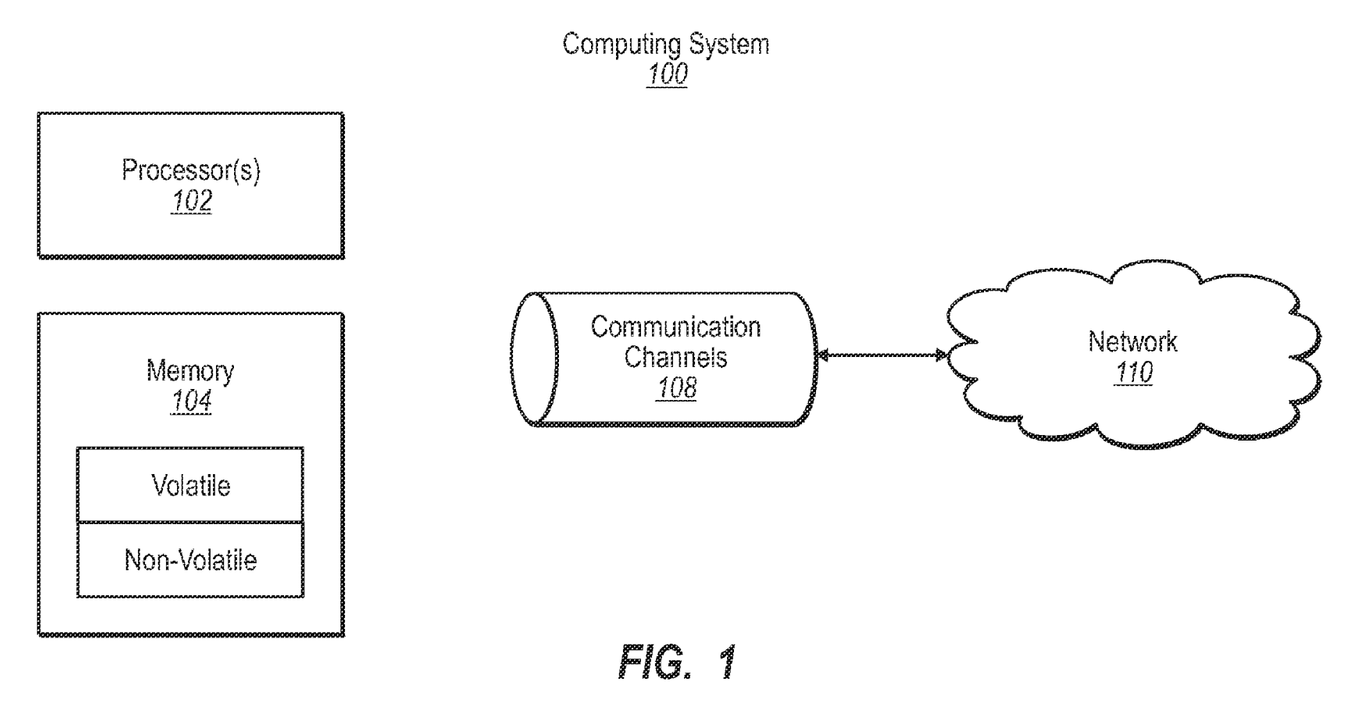
FIG. 1 illustrates a computing system in which embodiments of the principles of the present invention may operate.

FIG. 1 shows a schematic diagram of an exemplary computing system 100 that may be used to implement embodiments of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or as other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Critical Memory

Critical Memory (CM) is a modification to a typical flat memory model and CM recognizes that certain data, but not necessarily all, are critical to correct program execution.

Critical data may be defined to be a subset of data that which may be necessary for continued operation of an application in the presence of errors. Alternatively, critical data may be defined as a subset of an application's data whose consistency has been determined to be crucial to preserve in order to recover the application successfully after a failure. Critical data may be defined as the data an application programmer has determined is most important to preserve during execution of a particular application or process. An embodiment of CM allows that data and memory critical to the execution of a computer program may be identified and may then be protected from being corrupted by erroneous program stores or by other inadvertent corruption through hardware errors or errant behavior of function calls, library calls or action by third-party software. The concept of critical memory is introduced. Critical memory is memory which has been determined—by a programmer, by an automated system, or by other means—to be critical to the execution of a particular computer program.

CM may be used in applications where memory locations might become corrupted, either through unsafe program operations, possible race conditions, hardware transient faults, and so forth. CM, by its nature and by its design, is consistent and compatible with large bodies of existing computer programming code. CM has been designed to operate compatibly with existing computer programming code without the necessity of modifying the already existing code.

An important application of CM is to improve program reliability. Systems built upon CM may be used to recover from memory errors and hardware transient errors. CM may be used to provide systematic assurances that unwanted memory interactions between concurrent threads are not possible. CM may be used with Software Transactional Memory (STM), as is known to those skilled in the art, to provide additional safety and assurance of correct program execution. Proposed implementations of STM provide weak atomicity semantics—they do not guarantee the result of an atomic section is consistent if the data being updated in the section is also being modified elsewhere outside an atomic section. CM can be used to decrease the probability that incorrect threads writing to shared data outside an atomic section modify that data while a transaction is taking place. CM may be used alone or may be used in combination with STM to provide an optimistic concurrency implementation with lower probability of atomicity violations. CM has been designed to, when utilized, probabilistically tolerate errors caused by errant threads within computer software execution.

Computer software applications with built-in state-saving and error recovery mechanisms can recover from a broad range of software faults more often than applications that use generic techniques such as system-level checkpointing. Such recovery mechanisms are typically written by the programmer who makes assumptions about the consistency of the state saved by the application for recovery. CM formalizes the notions of critical data, and the state-saving, consistency-checking, and error recovery, above.

One particular embodiment of CM introduces the operations map_critical, unmap_critical, and promote. The map_critical operation may be used to designate specific memory as containing critical data. The unmap_critical operation may be used to designate specific memory, which had previously been designated as containing critical data, to be memory the contents of which does not contain critical data. The promote operation both maps a memory address as critical and promotes the contents of that address, whatever they are at the time the promote operation is invoked, to be critical.

The map_critical operation may be used to mark a memory address used in a program as critical. This places the data in the memory address under the protection of CM and guarantees that the data is safe from unintended modification, provided it is accessed according to the rules as provided by CM.

In one particular embodiment, two new memory operations are added to typical computer memory management models, critical_load and critical_store. Critical_load and critical_store are operations which are allowed to consistently read and modify, respectively, critical memory. No other program operations can modify the contents of critical memory with respect to subsequent critical_loads.

Figure 2:
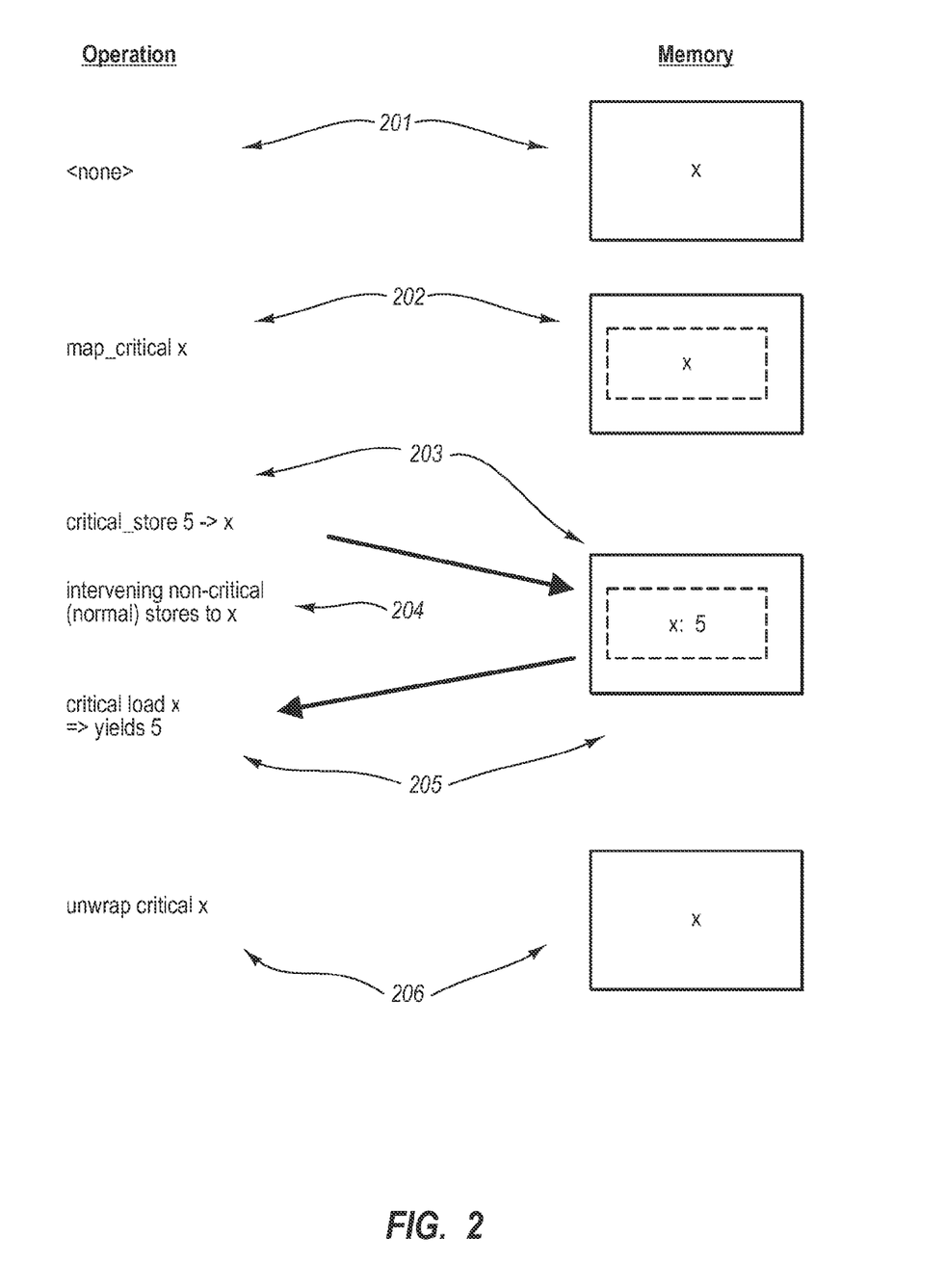
FIG. 2 illustrates the behavior in a typical embodiment of critical memory of memory and CM functions.

For example, FIG. 2 illustrates a typical memory state during the usage of functions enabled by CM. Before any CM functions are invoked, computer memory 201 contains a location x. After the CM map_critical x is invoked 202 then the memory location x is marked as critical (shown by the dotted enclosure). The CM function critical_store 203 places the value 5 into the critical memory location x. Any number of intervening non-critical (normal) stores 204 to the location x do not change the value placed by the critical_store 203. Even after normal stores 204 have attempted to change the critical value x, a critical_load 205 will return the value stored by the last critical_store 203 to the critical memory x. Only after an unmap_critical 206 is the memory location x returned to its normal non-critical designation.

Figure 5:
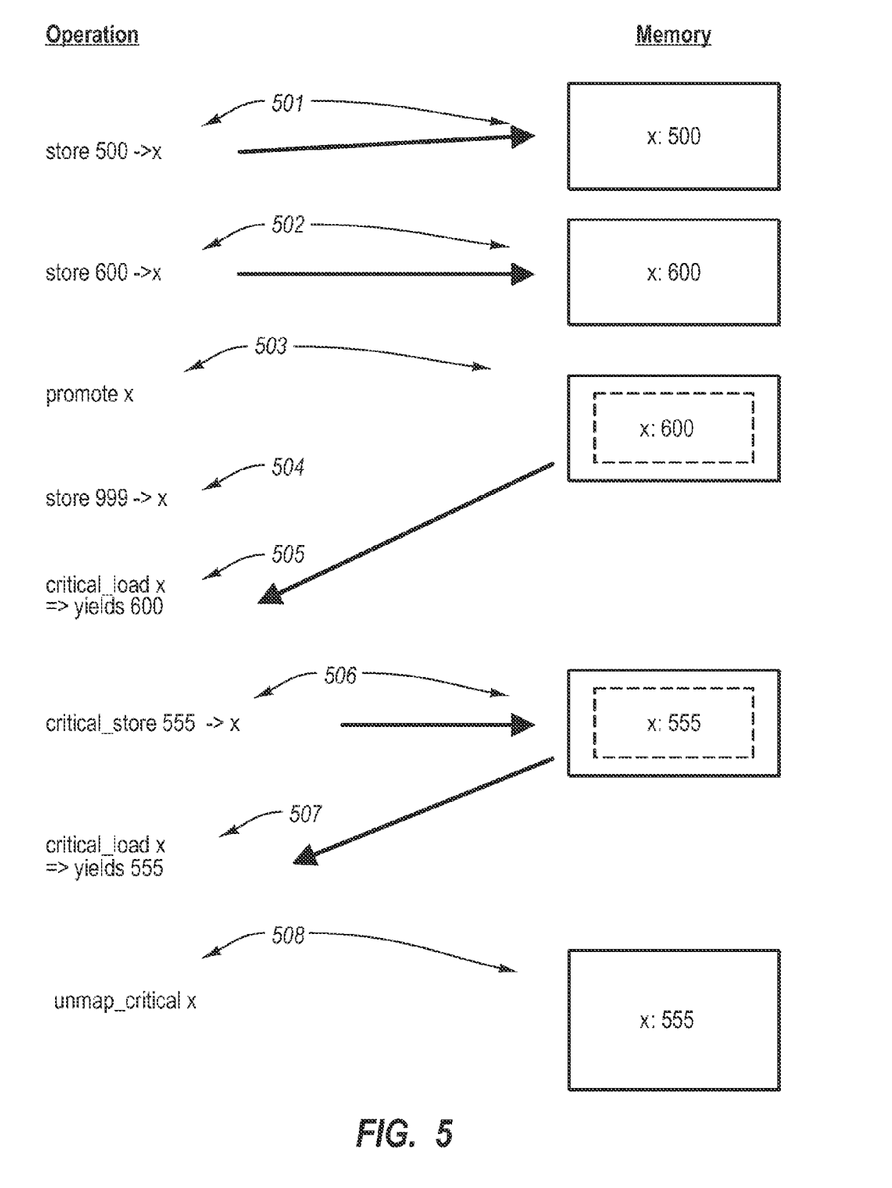
FIG. 5 illustrates typical memory usage in an embodiment of critical memory.

In another example, FIG. 5, it is shown how promote may be implemented in an example embodiment. A normal store 501 places a value into a normal memory location. Another normal store 502 may then write a different value into the same memory location. However, promote 503 may be used to designate the memory location as critical (as illustrated by the dotted enclosure) and the value at the time of promotion becomes the current critical value. After promotion, a normal store 504 attempting to change the value of the critical memory is unsuccessful. A critical_load 505 returns the critical value (and is immune from any intervening normal stores). Once promoted, however, a critical_store 506 can change the value of the memory location and a subsequent critical_load will return the value placed by the last critical_store 506. After an unmap_critical 508, the memory location is returned to its normal state and the value last there remains as its value.

A Summary of the operations defined in one embodiment of Critical Memory (CM) are summarized in Table 1.

TABLE 1

Summary of an Embodiment of CM Operations

| Name of Operation | Arguments | Semantics |
|---|---|---|
| map_critical | Address | Marks an address as critical and clears its contents. |
| unmap_critical | Address | Marks an address as non-critical, and preserves its contents. |
| critical_load | Address, Register | Does a critical load of the address contents into the register |
| critical_store | Address, Register | Does a critical store of the register contents to the address |
| promote | Address | Marks an address as critical and preserves its contents. |

A critical_load is defined as an operation that could potentially read from critical data and is allowed by the semantics of the program to do so. A critical_store is defined as a static instruction that could potentially write to critical data and is allowed by the semantics of the program to do so. CM guarantees that any update made to critical data through a critical_store will correctly update the critical data, and any update made to the critical data through a normal store will not be able to update the critical data (in a consistent way). Any read of the critical data done through a critical_load will see a consistent version of the data (whereas any read of the critical data done through a non-critical load may or may not see a consistent version. By consistent, it is meant that a critical_load to a critical memory location will read the value written by the last critical_store in the program to the critical memory location. CM ensures that any intervening updates to the critical data by non-critical stores will be transparent to the critical_load.

In one embodiment, a critical_load conveys the intent—by the programmer or otherwise—to read from critical data and is allowed by the semantics of a valid program to do so. A critical_store conveys the intent—by the programmer, by an automated system, or otherwise—to write to critical data and is allowed by the semantics of a valid program to do so. While a majority of a software application may not be type-safe, CM ensures that the subset of the program (for example, a class, function, or module) that uses critical_loads and critical_stores can be statically checked for correctness independent of the operations performed by the rest of the application and its libraries. Any code which violates memory safety should not be allowed to perform critical_stores and hence would not be able to overwrite the critical data. CM allows a programmer to preserve the consistency of critical data even in the presence of arbitrary unsafe code.

Guarantees of CM extend only to the critical data. CM does not provide any guarantees on to the non-critical data. In a program, the same instruction may access both critical data and non-critical data depending on the program context and execution flow. It is necessary to mark any load or store that may access critical data as a critical_load or critical_store. When non-critical data is accessed by a critical_load or a critical_store, the effect of the operation is similar to a non-critical load or non-critical store on the non-critical data. A non-critical load is allowed to read from critical data, but the degree of consistency of the data read by such a non-critical load would be defined by the particular implementation of CM.

The semantics of CM with respect to critical_loads and non-critical loads and critical stores and non-critical stores are summarized in Table 2.

As implemented in one embodiment, once a critical address has been unmapped using the unmap_critical operation, it can be accessed using normal loads and stores and critical_loads and critical_stores to that address have the same effect as normal loads and stores. Memory addresses may be unmapped, for example, when the programmer is finished using the memory region and de-allocates it (e.g., by using a free ( ) operation).

Figure 4:
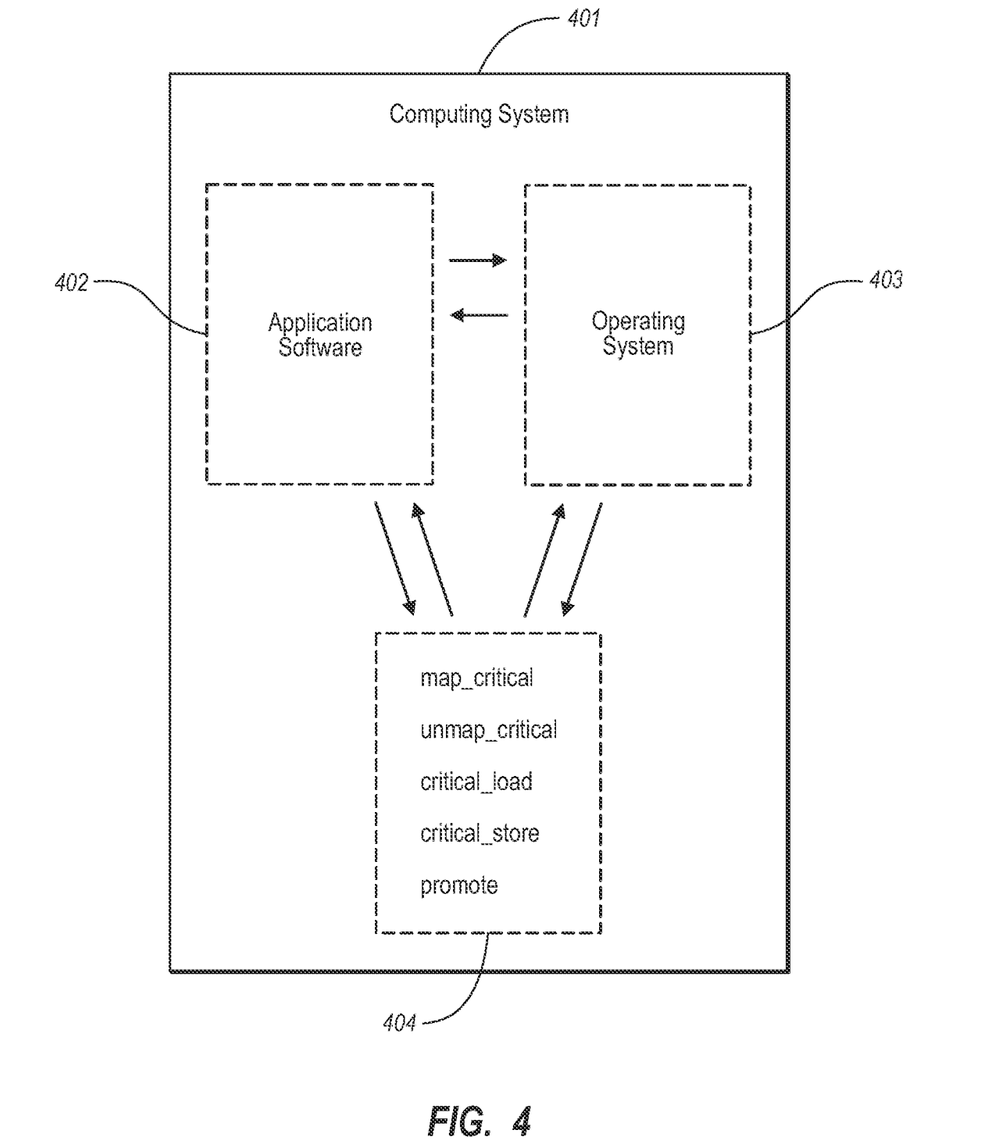
FIG. 4 illustrates a computing system in which the functions enabling critical memory are provided.

As can be seen in FIG. 4, the typical functions enabling CM 404 may be provided within a computing system 401 such that application software 402 may utilize the functionality provided by CM. The functionality of CM is independent of and compatible with other programming and memory techniques such that the application software 402 may utilize CM 404 or may deal in a normal fashion with the operating system 403 (or other available interfaces). It should be noted that the functionality of CM 404 may be provided by an API, provided as part of an operating system 403, may be provided within application software 402, itself, or may be provided by an independent library.

Reference Interleaving

In one particular embodiment, CM may be used by an application to protect critical data despite potential unsafe operations performed in third-party library code or in external function calls. CM may be implemented within an application that calls a library that has no knowledge of CM. CM may be implemented over a spectrum of choices concerning the semantics which constrain the CM implementation and which provide varying degrees of compatibility with non-CM aware libraries. By way of example, three degrees of compatibility are illustrated which may be implemented in particular embodiments of the present invention (but should not be considered to limit the scope of the present invention).

In the example, three illustrative degrees of compatibility may be termed Weak, Strong, and Extreme compatibility. Table 3 illustrates the results of loads and stores given the three illustrative degrees of compatibility.

TABLE 2

Interactions between CM loads and stores

| Type of Operation | Data being Accessed | Guarantees provided by CM |
| --- | --- | --- |
| critical_load | Critical Data | Guarantees that the value read is the one written to by the last critical_store to this location. |
| critical_store | Critical Data | Guarantees that the update is reflected in the critical data and is visible to future critical loads on the critical data. |
| critical_load | Non-Critical Data | This is equivalent to a non-critical_load on the non-critical data. |
| critical_store | Non-Critical Data | This is equivalent to a non-critical_store on the non-critical data |
| non-critical load | Critical Data | The value read by the load depends on the compatibility model of the particular embodiment |
| non-critical store | Critical Data | The effect of the update is not reflected in the critical data and future critical loads will not see this update. |
| non-critical store | Non-Critical Data | This updates the non-critical data similar to a regular store in a program. |
| non-critical load | Non-Critical Data | This reads from the non-critical data similar to a regular load in a program. |

TABLE 3

Compatibility Interleaving Semantics

| Interleaved Instruction Sequence | Weak Compatibility | Strong Compatibility | Extreme Compatibility |
|---|---|---|---|
| map_critical x<br>critical_store 5 -> x | | | |
| load x<br>store 6 -> x | x = 5 | x = 5 | x = 5 |
| load x<br>critical_load x<br>load x | x = undefined<br>x = 5<br>x = 5 | x = 6<br>x = 5<br>x = 5 | x = 6<br>x = 5<br>x = 6 |

The first column in Table 3 illustrates a sequence of interleaved memory operations. The remaining three columns show the value of the variable x assuming which of the three different degrees of compatibility is employed within the particular embodiment. After the memory location x has been marked as critical by the map_critical operation, and after the first critical_store of the value 5 into the location x, then, under each of the three degrees of compatibility, the value of x, when read by a load x, is 5. The differences in the degrees of compatibility are illustrated by the results after a subsequent normal store (i.e., not a critical_store) of the value 6 into the location x.

Under weak compatibility, there are no guarantees about the effects of non-critical stores to critical memory locations. As a result, after the non-critical store of 6 into location x, a non-critical load from the location x will produce undefined results. However, a critical_load from the location x will produce the value last stored by a critical_store which, in this case, is the value 5. After the critical_load from the location x, then the value of the location x has been guaranteed to be correct and consistent so, absent any intervening non-critical stores, then each subsequent load will also result in the value 5.

Under strong compatibility, a subsequent non-critical load from an address will result in the value stored by the previous non-critical store provided that an intervening critical_load has not restored the value or an intervening critical_store has not changed the value. In this case, the non-critical load from the address x will result in 6, the value stored by the preceding non-critical store (without an intervening critical_load or critical_store). Subsequent critical_loads, however, will result in the value 5 being returned—the value written by the previous critical_store. With the strong compatibility approach, third-party libraries will be able to modify critical data as if it were normal memory, but the effects of updates by the third-party libraries using non-critical stores will not be visible to subsequent critical_loads in the application.

Under extreme compatibility, loads from and stores to critical addresses are completely independent of critical_loads and critical_stores to the same addresses. A non-critical load from an address results in the value placed in the address by the last non-critical store to that address. A critical_load from a critical address results (as always) in the value stored in the address by the last critical_store. Under extreme compatibility, a critical_load will not restore the value stored by a critical_store for subsequent non-critical loads. Extreme compatibility can be used, for instance, in systems wherein called library functions perform call-backs into an application which contains critical_stores or critical_loads and it is desired that the stored data remain consistent within the library function.

Figure 3:
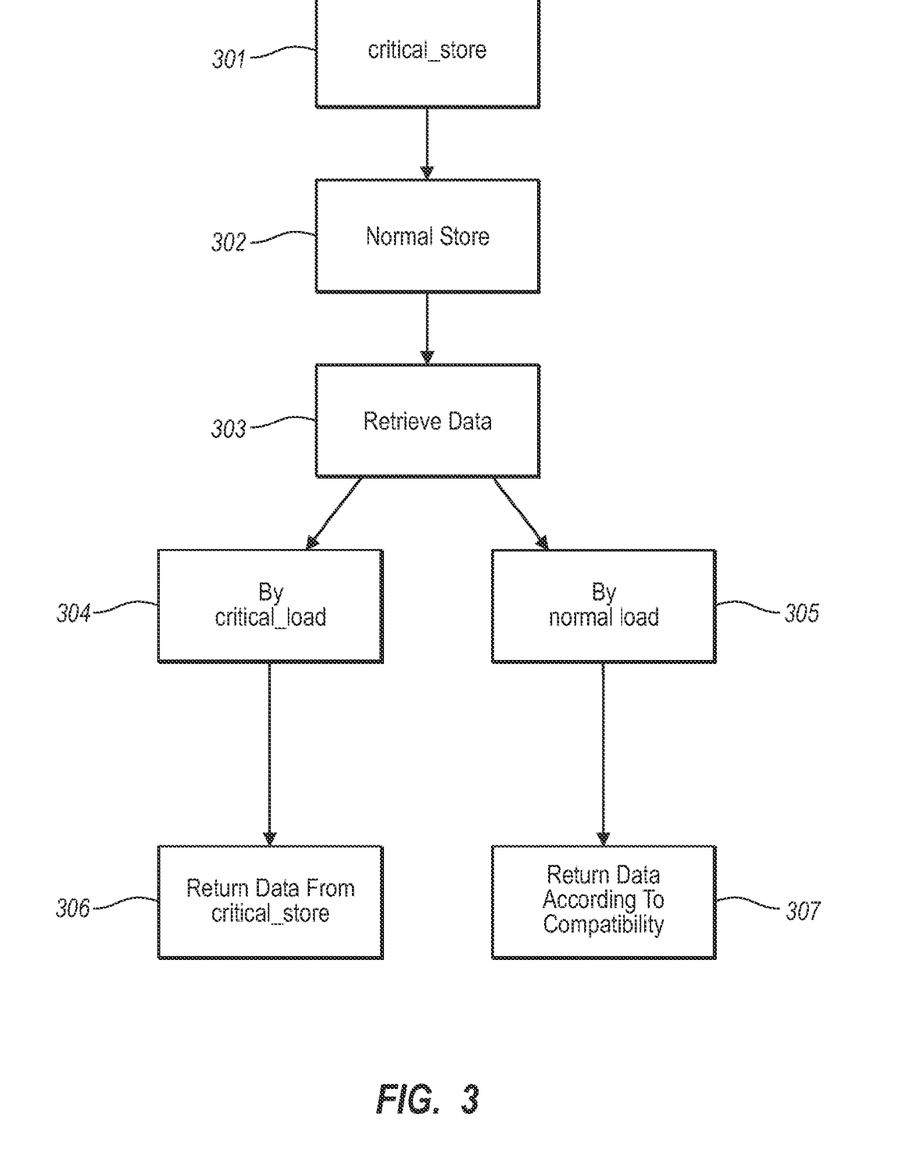
FIG. 3 illustrates the control flow in a typical embodiment of critical memory illustrating the use of compatibility semantics.

For example, in FIG. 3 the control flow in a particular embodiment of CM is illustrated. A critical_store 301 places a value into a memory location. After the critical_store 301, a normal store 302 attempts to place a value into the same location. A process then attempts to retrieve 303 the data from the memory location. If the value of the memory is loaded with a critical_load 304, then the value returned 306 is the value placed by the last critical_store 301. If the value of the memory is loaded by a normal (for the particular software process) load 305, then the value returned is the value determined by the class of compatibility semantics 307 (e.g., weak, strong, extreme) determined by the particular implementation.

CM and Libraries

An application employing CM may, in some instances, call library code which is potentially unsafe and which is not aware of an CM implementation or CM semantics. Library code is not CM-aware if it does not allocate critical data or perform critical_loads or critical_stores. In a case where the library code does not need to modify critical data, the library code can execute as it was written and the loads and stores the library code does to non-critical data occur as if CM was not being used. If library code performs non-critical loads from critical addresses, then the values read will be consistent with the values written to the addresses by the CM-aware main application prior to calling the library.

If a library is required to modify critical data, then, as in some embodiments, additional actions are necessary. An example is illustrated by the following pseudo-code:

```
map_critical x
critical_store 5 -> x
...
unmap_critical x
call library foo
promote x
```

In this example, the address x is unmapped before calling the library foo, allowing the non-critical stores in the library to update the address in a way that will be visible to the main program. After the call, the address x is promoted, which simultaneously makes the address x critical again and makes the current value—as stored by (the possibly CM-unaware) library foo—the critical value.

While the above example assumes a library which is not CM-aware, in some embodiments, libraries may also be written using their own CM critical memory. This would lead to the issue of interfering critical memory updates between a library and the application. An approach in one particular embodiment would be to associate a unique key with each compilation unit (i.e., library or application) and tie each static critical memory operation in a unit to the unit's unique key. In this case, critical memory that is mapped with one key could only be updated with a critical_store that had the same key associated with it.

By following the above approaches, embodiments of CM allow incorrect library functions which have memory errors to continue execution and see a consistent view of memory (by using strong or extreme compatibility semantics). In these embodiments, CM guarantees that the critical data of the application is not impacted by the memory errors introduced by library functions as long as the library does not perform verfied_stores to the application's critical data.

Local Immutability

In some embodiments, CM may also be used to provide local immutability of data. For example, a program which is about to open a file for update might check to see if the file is in a particular scratch directory to limit the effect the update can have on the rest of the file system. A security exploit of this action involves a race condition whereby the string that was checked is updated by another thread between the time of the check, and the time the file is actually opened. If the string were truly immutable, then the subsequent update would be impossible, and the problem is solved. CM may be employed to accomplish this effect by doing a map_critical of the memory locations before the check, using a critical_load when the operation is performed, and doing an unmap_critical after the operation. When this procedure is followed, non-critical updates to these locations in the time between the check and the operation are ignored by the critical load.

By the above procedure, CM can provide the functionality of local immutability, which can be appreciated by those skilled in the art, is an element which can enhance the guarantees provided by Software Transactional Memory ("STM"). It may be appreciated that CM may be employed in this fashion to ensure local immutability independently of STM and may also be used in conjunction with STM as CM adds additional and orthogonal functionality Optimization Opportunities Using CM In certain embodiments, CM may provide opportunities for enhanced performance through optimizations made possible by CM. One such opportunity is based on the observation that critical_loads and critical_stores will generally, but not necessarily, form a small subset of all loads and stores within a typical software application. If the particular embodiment employees weak compatibility semantics, as discussed above, critical_loads and critical_stores can be repositioned independently relative to other loads and stores in the software application. For example, in the code sequence:

```
critical_store 5 -> x
loop:
    <no critical operations>
    store 100 -> y
    store 500 -> z
    critical_load x
    goto loop
```

The critical_load of x can be moved out of the loop because the intervening loads and stores are guaranteed not to change the value of x. This would result in the following code sequence which reduces the computation overhead of performing the critical_load x each time through the loop:

```
critical_store 5 -> x
critical_load x
loop:
    <no critical operations>
    store 100 -> y
    store 500 -> z
    goto loop
```

Because the results of critical_loads and critical_stores are unaffected by other normal loads and stores, they may form a well-typed and statically checkable independent subset of the computation being performed by the rest of the software program. As a result, the optimizer can more aggressively reorder critical operations and normal operations because it knows that they are independent.

A second optimization of CM is possible in another embodiment. CM introduces the ability to reason locally about critical values. When addresses are mapped as critical and local to a component, then an optimizer is guaranteed that other components, even when executing in the same address space, cannot modify the critical addresses unless they are specifically allowed to do so. As such, use of critical memory as taught by CM may provide data-centric guarantees of isolation even within the same address space.

In certain embodiments, CM may be considered to be an embedding of a smaller, simpler, well-typed program—operating only on critical data—within another, larger, program. The simpler critical data program provides the optimizer additional opportunities for optimization over the original program which, when written in C or C++, as those with ordinary skill in the art are aware, often contain aliases that confound attempts at static analysis necessary for optimization.

Improving Atomicity Semantics with CM

In certain embodiments, CM may be used in conjunction with transactional memory to provide probabilistic isolation guarantees to transactional memory implementations which, by their nature, provide only weak atomicity. Many transactional memory implementations use optimistic concurrency control for transactional reads and write-in-place semantics in order to achieve high-performance. However, transactional memory provides weak atomicity in order to achieve this high-performance.

In particular embodiments, CM may be used with software transactional memory (STM) schemes to provide a low-overhead method for decreasing the probability that conflicting memory operations will violate the atomicity of the STM implementation. CM may be used to temporarily hide effects of updates to memory from other threads during the execution of an atomic section. CM critical_load and critical_store operations may be paired with complimentary STM operations. For each memory location which is modified in an atomic section, STM can provide support for conflict detection and undo, while the CM system can independently provide for resilience to external modification outside the thread.

The code sample "a" (which is written in a C-like pseudo-code), below, shows a simple example of STM code which atomically accumulates a local value, localSum, into a shared variable, Total->Sum.

```
a) Original STM Program

// Total is a struct containing a global integer, Sum,
// and is shared
while (element = iter->get( ) ) {
    localSum = element->value( );
    atomic {
        Total->Sum += localSum;
    }
}
```

The code sample "b", below, shows the pseudo-code corresponding to the code, above, with STM primitives exposed. In this example, C++ exception handling is used to encapsulate the body of the atomic block. A runtime primitive TxStart creates a new transaction container. Accesses to the shared variables are done via runtime primitives, TxRead and TxWrite. The TxCommit primitive is called at the end of the atomic block to complete the transaction. If the transaction state is valid and there is no conflict with another transaction, the effects of the transaction are published to shared memory. Otherwise, an internal exception, TxError, is raised. The handler for this exception, in the event of the exception, rolls back the transaction state and re-executes the transaction body.

---
b) STM Program with Primitives Exposed
---
```
while ( element = iter->get( ) )
{
    localSum = element->value( );
    void * Tx = TxStart( );
    RestartLabel:
    try
    {
        TxRead(&Total->Sum);
        tmp = Total->Sum;
        tmp = tmp + localSum;
        TxWrite(&Total->Sum);
        Total->Sum = tmp;
        TxCommit( );
    }
    catch (TxError * errorCode)
    {
        TxRollback(errorCode, Tx);
        goto RestartLabel;
    }
```
---

CM is integrated with STM in the code, above, in order to prevent a third thread which does not follow the transaction protocol from writing to the shared variable Total, outside the atomic section and corrupting it. An example of such use of CM as integrated with STM is shown in code sample "c", below. CM is used to restore the contents of the Total variable to its contents within the atomic section. Calls to critical_store and critical_load operations are inserted within the atomic section along with the TxRead and TxWrite operations. These verified operations will ensure that the value of the Total variable is unlikely to be updated outside the atomic section.

---
c) STM/CM program with primitives exposed
---
```
while ( element = iter->get( ) )
{
    localSum = element->value( );
    void * Tx = TxStart( );
    RestartLabel:
    try {
        critical_load(&Total->Sum);
        TxRead(&Total->Sum);
        tmp = Total->Sum;
        tmp = tmp + localSum;
        TxWrite(&Total->Sum);
        Total->Sum = tmp;
        critical_store(&Total->Sum, tmp);
        TxCommit( );
    }
    catch (TxError * errorCode)
    {
        TxRollback(errorCode, Tx);
        goto RestartLabel;
    }
}
```
---

As can be appreciated, in code sample "c", above, the critical_load call does not actually perform the load, but it verifies that the data value loaded by the TxRead is consistent and has not been corrupted. The CM critical_load is inserted just before the STM TxRead to ensure that the value read by the STM library function is consistent with the value observed by the CM implementation. Similarly, the critical_store is inserted after the actual store (TxWrite) so that the value is only updated if the transaction is not rolled back by the STM implementation. It is by mechanisms similar to that illustrated that CM may be used to provide additional atomicity and security when used in conjunction with STM implementations.

Two other mechanisms are illustrative, but should not be considered restrictive, of CM integration with STM. When a transaction is rolled back by STM, values of variables modified within the transaction are restored to their original values. The restoration of the values by STM are made visible to CM by use of the promote operation. By promote, the values as restored by STM are made the values recognized by CM and maintained consistently by CM.

When a transaction is committed by STM, values written within a transaction are written to a permanent state and contents of memory locations are updated with these values. By calling an CM call-back function within STM, just before the STM transaction commit, which performs a critical_load operation on every value that is written to the permanent state, then the value written to the permanent state is correct and consistent by ensuring that the value is that written by the last critical_store.

Accordingly, the principles of the present invention provide a mechanism for creating, maintaining, and employing critical memory (CM) for protecting critical data and computer memory from corruption by erroneous program stores, hardware memory errors, and inadvertent updates. CM allows data which is critical to the execution of a program to be protected and consistency of data to be ensured.

As can be appreciated by those with skill in the art, the present invention may be embodied in specific forms other than or in addition to those described without departing from its spirit or essential characteristics. The described embodiments are to be considered in all aspects only as illustrative but not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising one or more computer processors and computer memory for storing data, a method for distinguishing critical data and non-critical data in an application during application runtime, allocating distinct memory for critical data and non-critical data, and protecting stored critical data from unintended changes, the method comprising:

determining that a first subset of data in an application is critical data and determining that a second subset of data in the application is normal, non-critical data;

during execution of the application, allocating first computer memory as normal memory for the non-critical data using a normal memory allocation such that a normal store operation can change the value of data stored in the normal memory;

during execution of the application, allocating second computer memory as critical memory for the critical data by using an operation which designates the critical memory as critical such that a value stored to the critical memory using a critical store operation is preserved and remains unchanged after one or more intervening normal store operations to the critical memory;

storing the critical data, during execution of the application, within the allocated critical memory, using the critical_store operation which verifies the store of the data and guarantees the verified stored critical data is visible to future loads of the verified stored critical data; and loading data, during execution of the application, from the critical memory to which the data was stored using a critical_load operation which verifies the load such that the data loaded is guaranteed to be the value last stored using the critical_store operation.

2. The method of claim 1 wherein the data stored by the critical_store is a subset of the data stored by a software process.

3. The method of claim 2 further comprising storing data to critical memory using a normal store and loading the stored data, wherein data stored by a normal store and loaded conform to weak compatibility.

4. The method of claim 2 further comprising storing data to critical memory using a normal store and loading the stored data, wherein data stored by a normal store and loaded conform to strong compatibility.

5. The method of claim 2 further comprising storing data to critical memory using a normal store and loading the stored data, wherein data stored by a normal store and loaded conform to extreme compatibility.

6. The method of claim 1, further comprising optimizing a software process by independent repositioning within the software process one or more functions, each of the repositioned functions comprising at least one of a critical_load or a critical_store.

7. The method of claim 1 further comprising using software transactional memory.

8. In a computing system, a method for a memory system which facilitates distinguishing critical data and non-critical data in an application during application runtime and implements a method for designating already stored non-critical data as application critical data and protecting the already stored non-critical data from unintended updates, the method comprising:
  storing data using a normal store operation to computer memory;
  promoting the computer memory containing the data previously stored using the normal store operation to critical memory using an operation which changes the status of the computer memory and designates the promoted computer memory as critical memory and further designates the contents of the promoted memory at the time of promotion as critical data, wherein the previously stored data is application data and wherein the previous store and the promoting each occur during execution of the application;
  loading a value from the promoted computer memory using a function which verifies that the value loaded is one of:
    the value of the memory at the time the memory was promoted if no critical store has written a value to the critical memory subsequent to the memory having been promoted to critical and regardless of any intervening normal stores having attempted to store data to the critical memory, and
    the value last stored by a critical store if a critical store has written a value to the critical memory.

9. The method of claim 8 wherein the memory promoted comprises a subset of the storage memory used by a software process.

10. The method of claim 8 further comprising storing data to promoted memory using a normal store wherein data stored by a normal store conform to weak compatibility.

11. The method of claim 8 further comprising storing data to promoted memory using a normal store wherein data stored by a normal store conform to strong compatibility.

12. The method of claim 8 further comprising storing data to promoted memory using a normal store wherein data stored by a normal store conform to extreme compatibility.

13. The method of claim 8 further comprising compatibly calling libraries unaware of critical memory.

14. The method of claim 8 further comprising using software transactional memory.

15. A system enabling the protection of critical data, the system comprising one or more computer processors and one or more computer storage devices having stored therein computer executable instructions which, when executed upon at least one of the one or more computer processors, the system providing functions comprising:
  map_critical,
  unmap_critical, which designates memory previously designated as containing critical data, to be memory the contents of which does not contain critical data,
  promote, which maps a memory address as critical and promotes the contents of that address, whatever they are at the time the promote operation is invoked, to be critical,
  critical_load, and
  critical_store; and
  the system enabling the method as recited in claim 1.

16. The system of claim 15 wherein the functions provided are provided by an API.

17. The system of claim 15 further comprising a normal store function and a normal load function wherein the normal store and normal load functions conform to weak compatibility.

18. The system of claim 15 further comprising a normal store function and a normal load function wherein the normal store and normal load functions conform to strong compatibility.

19. The system of claim 15 further comprising a normal store function and a normal load function wherein the normal store and normal load functions conform to extreme compatibility.

20. The system of claim 15 wherein the provided functions are compatible with both C and C++ programming semantics.

* * * * *